Feb. 18, 1958
J. C. GRIGGER ET AL
2,824,027
METHOD OF MAKING LOW RESISTANCE CONTACT
WITH A LEAD DIOXIDE ELECTRODE
Filed Sept. 15, 1955
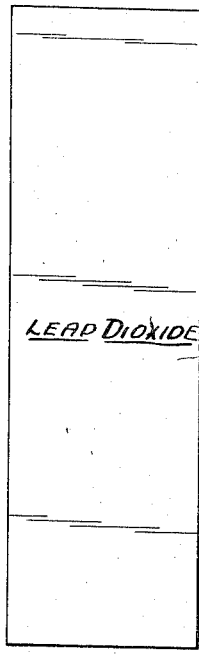
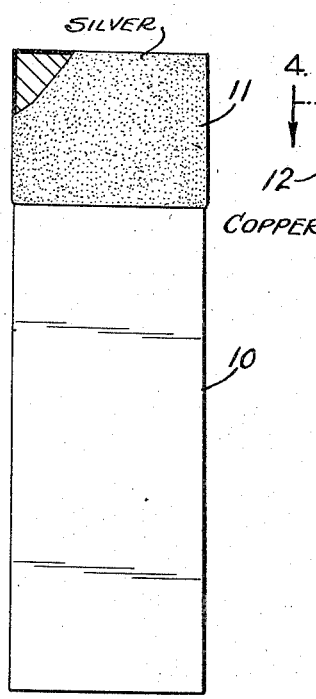
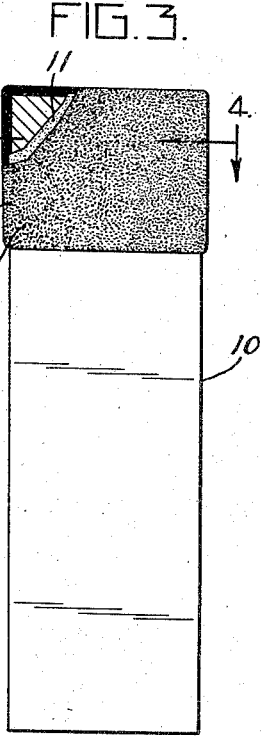
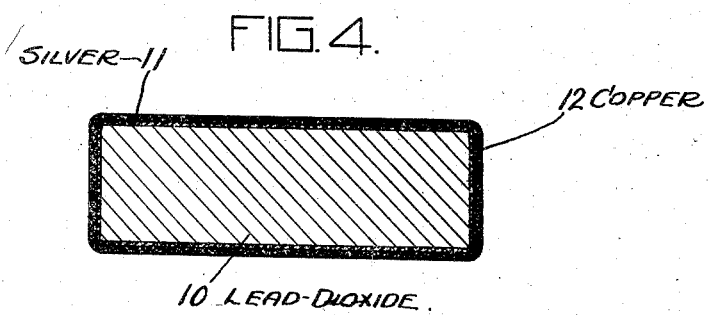
INVENTORS:
JOHN C. GRIGGER
HENRY C. MILLER
BY Howson & Howson
ATTYS.

United States Patent Office 2,824,027
Patented Feb. 18, 1958

2,824,027
METHOD OF MAKING LOW RESISTANCE CONTACT WITH A LEAD DIOXIDE ELECTRODE

John C. Grigger, Springfield Township, Montgomery County, and Henry C. Miller, Hatfield, Pa., assignors to Pennsalt Chemicals Corporation, a corporation of Pennsylvania Application September 15, 1955, Serial No. 534,617

3 Claims. (Cl. 117—212)

This invention relates to the making of electrical contact with lead dioxide electrodes.

In some electrolytic processes, lead dioxide electrodes are well suited to the requirements. For example, a lead dioxide anode is well suited for use in an electrolytic process where an inert non-corroding anode is required, as in the case of a chlorate-perchlorate electrolytic cell. Massive lead dioxide anodes for such usages may be formed by anode plating lead dioxide to a substantial thickness on a suitable conductive base or supporting element. For example, lead dioxide may be plated on a thin tantalum screen from an acid lead nitrate plating bath.

While lead dioxide electrodes are desirably inert and non-corrosive, their use in the past has been largely inhibited because of the lack of a suitable method of making electrical contact therewith. Compared to its relatively low internal resistance, massive lead dioxide normally has a very high electrical contact resistance when any of the usual means are employed for making electrical contact with it. For example, the use of metal pressure plates and clamps against the outside surface of a lead dioxide body is inadequate to provide low resistance contact with such body and to prevent heating in the contact area even with moderately low currents.

The present invention evolved from considerable experimentation in an effort to solve the problem, during which various methods were tried and were unsuccessful. An attempt was made to solve the problem by closely wrapping the upper end of a lead dioxide anode with copper or nickel wire to serve as current leads, and then casting a low melting alloy, such as Wood's metal, around the wrapped wire. Although this gave lower contact resistance than the use of pressure plates, it was not satisfactory. The physical arrangement was too bulky, and furthermore the Wood's metal did not wet the lead dioxide surface well, and so the contact was not dependable. In some cases, the electrode became hot due to the poor current contact, and the Wood's metal melted and fell into the cell in which the lead dioxide was being operated as an anode.

In another attempt to solve the problem, nickel wire was wound tightly around the upper end of a tantalum supporting element, and massive lead dioxide was then plated over this assembly. In use of the finished electrode, the free ends of the nickel wire served to carry the current into the lead dioxide. One disadvantage of this method was the tendency for the erosion of the nickel wire in the plating bath (acid lead nitrate) when in contact with the tantalum supporting element either externally or within the bath. Another disadvantage of this method was that during plating, the lead dioxide formed more heavily on the nickel than on the tantalum in the same area, resulting in nodular growth and uneven thicknesses with massive lead dioxide deposits.

After various unsuccessful attempts such as those above mentioned, it was found that very low resistance contact can be made with lead dioxide by means of a noble metal, preferably silver, in intimate engagement with a surface area of the lead dioxide; and it was further found that low resistance connection to lead dioxide can be effected in a practical and economical manner by employing a relatively thick body of inexpensive good-conducting metal, such as copper, in intimate engagement with a thin body of the noble metal engaging the lead dioxide surface. This relatively thick body protects the thin noble metal, it enables easy connection as by means of soldering or the use of clamping plates, and it minimizes heating at the contact as the relatively large area of metal enables greater current flow with less heating. Moreover, the relatively thick body of copper or the like can be machined to obtain flat smooth surfaces, especially where clamping plates are to be employed.

In the preferred practice of the method according to this invention, a thin coating of silver is sprayed onto the contact surface area of a lead dioxide electrode, and a relatively thick overcoating of copper is sprayed over the silver. The surface of a lead dioxide electrode, as it comes from the plating process, is more or less crystalline and similar to the surface of fine emery cloth. Thus the as-plated surface of the lead dioxide provides many points which are useful for binding a coating of silver or the like to the lead dioxide. The formation of a coating, as by spraying, enhances intimate adherent engagement of the metal with the rough surface of the lead dioxide. Thus a thin coating of silver applied to the surface of the lead dioxide is mechanically bound thereto by the virtue of the nature of the surface, and furthermore the intimate engagement gives excellent low contact resistance.

In experimental practice of this method, the silver was applied with a spray gun into which was fed 1/8" diameter wire. While spraying is preferred, the silver coating may be applied in any other suitable manner, for example it may be deposited on the lead dioxide by reduction from a silver salt solution.

The application of the overcoating of copper or like metal may also be performed in any suitable manner. However, it is also preferred to spray the overcoating metal onto the silver. Copper is preferred as the overcoating material because of its conductivity, hardness, and ease of machining.

Generally speaking, it is desirable to use no more silver than is necessary to give the desired low contact resistance. Not only is the silver expensive but a thin coating will bond more effectively to the lead dioxide surface. Experimentation has shown that a silver coating as thin as 0.001" or less is sufficient. The copper overcoating should be thick enough to permit machining of the faces to plane surfaces if desired, and to carry the current load without appreciable heating. Experimentation has shown that a thickness of 1/8" or more is satisfactory.

The accompanying drawing illustrates clearly the manner of practicing the present invention.

Fig. 1 is an elevational view of an electrode before coating,

Fig. 2 is an elevational view of the electrode with a silver coating thereon,

Fig. 3 is an elevational view of the electrode with the silver and copper coatings thereon, and Fig. 4 is a sectional view taken on line 4—4 of Fig. 3.

The process as defined hereinabove consists in coating a limited surface area of an electrode 10, which consists of lead dioxide, initially with a very thin silver coating 11 preferably sprayed thereon and subsequently applying a relatively thick overcoating 12 of copper or the like. The overcoating of copper 12 is also preferably sprayed on and the two coatings are intimately bonded to one another and to the electrode. The dimensions or thickness of the respective coatings have been defined hereinbefore.

It has been found from actual tests that the method provided by this invention is effective to produce very low resistance contact with lead dioxide electrodes. In these tests, the contact resistance was determined by passing one ampere of current through the contact and determining the potential drop across the contact by means of a precision potentiometer. With one ampere of current, the potential value was numerically equal to the contact resistance by Ohm's law. Generally speaking, the resistance of the contact attained by this method is about 0.0002 ohm which is far below the resistance values obtained by other methods.

By way of example, a lead dioxide electrode to which electrical connection was made according to this invention was operated as an anode in a chlorate-perchlorate cell at 100 amperes and an anode current density of 28 amp./dm.$^2$. The cell voltage was 6.3, and the anode remained cool without any local heating in the current contact area.

While silver is preferred as the contacting metal because it is the least expensive of the noble metals, the invention is not limited thereto but contemplates the use of other noble metals such as gold and platinum.

Further, while it is preferred to form a coating by spraying, in some instances a satisfactory low contact may be formed by wrapping or pressing sheet, plate or wire of the noble metal to the lead dioxide. Heavier plates of a less expensive conductive material, such as copper, may be clamped to the noble metal contact material to press it against the lead dioxide and to enable external connection.

It will be understood therefore that the invention is not limited to the preferred form but contemplates such other forms as may occur to those skilled in the art.

We claim:

1. A method of making low resistance contact with a lead dioxide electrode, which comprises spraying silver onto a limited surface area of said electrode in a position arranged to be outside of the electrolyte in which the electrode is immersed and to form a coating in intimate adherent engagement with said surface area.

2. A method of making low resistance contact with a lead dioxide electrode, which comprises spraying a thin coating of silver onto a limited surface area of said electrode in a position arranged to be outside of the electrolyte in which the electrode is immersed, and spraying a relatively thick overcoating of conductive material onto said first coating.

3. A method of making low resistance contact with a lead dioxide electrode, which comprises spraying a thin coating of silver onto a limited surface area of said electrode in a position arranged to be outside of the electrolyte in which the electrode is immersed, and spraying a relatively thick overcoating of copper onto said first coating.

References Cited in the file of this patent

UNITED STATES PATENTS

| | | |
|---|---|---|
| 333,292 | Fitzgerald et al. | Dec. 29, 1885 |
| 935,250 | Engelhardt et al. | Sept. 28, 1909 |
| 1,263,959 | Swartley | Apr. 23, 1918 |
| 2,119,608 | Stewart | June 7, 1938 |
| 2,317,759 | Haebler | Apr. 27, 1943 |

OTHER REFERENCES

Wein: Metallizing Non-Conductors, 1945, pages 48 and 49.

Fink et al.: The Electrochemical Society, Preprint 79-10, 1941, pages 141-155.